Figure 1:
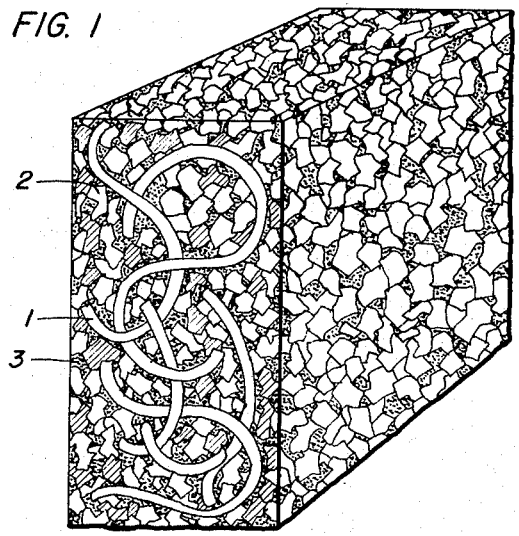

Sept. 1, 1959 J. B. EISEN 2,902,530
BATTERY CONSTITUENTS
Filed Oct. 12, 1955

INVENTOR.
JOHN B. EISEN
BY
Attorney

United States Patent Office 2,902,530
Patented Sept. 1, 1959

2,902,530

BATTERY CONSTITUENTS

John B. Eisen, Waterloo, Wis., assignor to Bjorksten Research Laboratories, Inc., Fitchburg, Wis., a corporation of Illinois Application October 12, 1955, Serial No. 539,963

2 Claims. (Cl. 136—20)

This invention relates to battery components and batteries, and more specificially to a new type of electrodes and electrode plates.

Heretofore it has been the practice to paste the chemically active constituents into grids of punched plates or metal plates in order to prepare the battery plate assemblies. These procedures have the disadvantage that inherently relatively heavy and thick plates will result from such procedures. Furthermore, the preparation of the grids or punched metal sheet is expensive, and the pasting procedure is tedious.

This application is a continuation-in-part of application Serial No. 271,931, filed February 16, 1952 and now abandoned.

An object of the present invention is to obviate the need for preformed metal plates and further to obviate the needs for pasting procedures.

Another object is to prepare less expensive battery plates.

A further object is to adapt the preparation of battery plates to printing techniques.

A still further object is to employ inexpensive, readily available metal products for the manufacture of battery plates.

Further objects will become apparent as the following detailed description proceeds:

In accordance with my invention, I employ as a base material for my battery plates a web of fibrous metal, such as, for example, steel wool. To this steel wool I adhere, by roller coating, compression or printing methods, by spraying or any other suitable application methods, a paste of electrochemically active material or "printing ink" such as any of the materials used on battery plates suspended in an adhesive composition which on drying will exclude from direct contact with the fibrous material, the electrolytes present in the battery system of which these components are going to be part, but still permitting electronic contact between the suspended galvanically active material and their fibrous metal.

Figure 2:
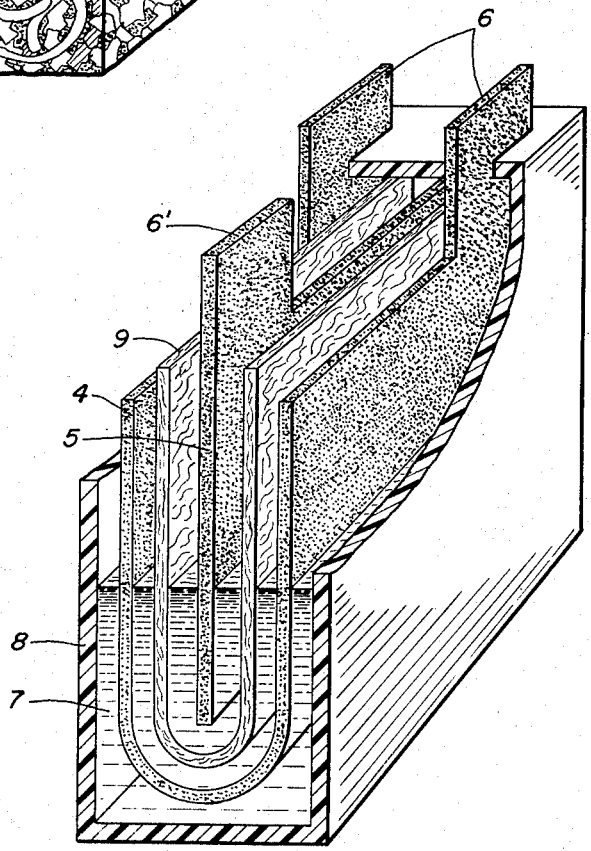

In the drawings like reference numerals refer to like parts and:

Figure 1 is an enlarged perspective view of a portion of a battery plate according to the invention; and Figure 2 is a partially cutaway view of a cell provided with plates according to the invention.

Referring now to Figure 1 there is shown a portion of a battery plate which has been pasted wherein the base metal fiber 1 of the steel wool is in contact with the granules 2 of the suspended galvanically active material and the binding adhesive 3 binds these elements together without allowing access of surrounding electrolyte to the fibers of the metal wool.

As shown in Figure 2, a cell may be made with an anode 4 and cathode 5 prepared according to the invention, provided respectively with terminal extensions 6 and 6' for the attachment of leads thereto. The plates may be disposed within a container 8 and immersed in electrolyte 7, and provided with a paper separator 9.

Assuming, for example, that the material of the anode is steel wool pasted with zinc, and that the cathode is stainless steel wool pasted with mercuric oxide, the battery will function through an electrolyte of 30% KOH aq. in this manner: The zinc reacts with the caustic electrolyte, leaving negative charges on the steel anode. Through the working circuit, opposing charges will be "depolarized" at the stainless steel cathode, with the reduction of an equivalent HgO to Hg.

As a specific example a plate was made as follows: steel wool was enveloped and compressed between two sheets of filter paper which had each been coated on the inside with a paste of in quantity of 1.5% aqueous solution of carboxymethylcellulose just sufficient to fill the interstices in the zinc dust. This plate was placed in a cell with one AgO cathode and an electrolyte consisting of 30% KOH in water. The cell delivered 1.5 amp. at 1.2 volts for three minutes with a relatively level discharge curve.

By way of another example, a cadmium-coated steel wool anode was reacted through 25% NaOH aq. with a cathode of silver peroxide upon stainless steel wool according to these net equations:

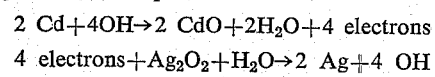

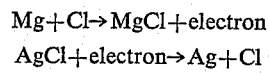

Similarly, magnesium powder is coated on a two-dimensional steel wool anode base and this reacts through an electrolyte of NaCl aq. with AgCl fused onto a grid of silver gauze:

$$Mg + Cl \rightarrow MgCl + electron$$

$$AgCl + electron \rightarrow Ag + Cl$$

While certain examples have been shown by way of illustration and not of limitation, it is fully understood that considerable variation may take place in the choice of material, without substantial departure from the spirit or scope of the invention. For example, instead of the steel wool shown in Example 1 or the grid of silver gauze mentioned in the second example, I may employ felted threads or strands of other metal, such as silver or silver coated or surfaced gauze of glass or other ceramic material, gold, platinum, copper, zinc, brass, and in acid electrolyte system, even aluminum or magnesium, although these are not ordinarily preferred. As the pasted cathode depolarizer material I may use mercuric oxide, silver peroxide, cuprous oxide, cupric oxide, ferric oxide, nickel oxides, lead dioxide, manganese dioxide, silver chloride, silver oxide. On the anode I may use powders of zinc, aluminum, magnesium, cadmium. As adhesives I have found particularly useful certain polymeric materials and particularly polyelectrolytes such as, for example, polyvinyl pyrrolidone, polyacrylonitrile, polyvinyl chloride, polymethacrylic acid, polyfluoro silicates such as calcium fluoro silicate, or fluorosilicone cements, cellulose ethers, and the like.

It is thus seen that this invention is broad in scope and is not to be restricted, excepting by the claims, in which it is my intention to cover all novelty inherent in the invention.

Having thus disclosed my invention, I claim:

1. An electrical battery cell, in which one of the electrodes consists of a magnesium powder held substantially in plate form by means of a two-dimensionally extended fibrous stainless steel mass, and adhered to said mass by means of polyvinyl pyrrolidone, providing electronic contact between the said anode powder and the said stainless steel mass.

2. An electrical battery cell, in which one of the electrodes consists of an aluminum powder held substantially in plate form by means of a two-dimensionally extended fibrous brass mat, and adhered to said mat by means of polyacrylonitrile, providing electronic contact between the said powder and the said brass mat.

References Cited in the file of this patent

UNITED STATES PATENTS

| | | |
|---|---|---|
| 2,658,935 | Chubb | Nov. 10, 1953 |
| 2,688,649 | Bjorksten | Sept. 7, 1954 |
| 2,708,683 | Eisen | May 17, 1955 |
| 2,738,375 | Schlotter | Mar. 13, 1956 |

FOREIGN PATENTS

| | | |
|---|---|---|
| 653,235 | Great Britain | May 9, 1951 |

UNITED STATES PATENT OFFICE
Certificate of Correction

Patent No. 2,902,530                           September 1, 1959

John B. Eisen

It is hereby certified that error appears in the printed specification of the above numbered patent requiring correction and that the said Letters Patent should read as corrected below.

Column 2, lines 25 to 27 should appear as shown below instead of as in the patent—

$$2Cd + 4OH^- \rightarrow 2CdO + 2H_2O + 4 \text{ electrons}$$
$$4 \text{ electrons} + Ag_2O_2 + H_2O \rightarrow 2Ag + 4OH^-$$

same column 2, lines 33 to 35 should appear as shown below instead of as in the patent—

$$Mg + Cl^- \rightarrow MgCl + \text{electron}$$
$$AgCl + \text{electron} \rightarrow Ag + Cl^-$$

Signed and sealed this 8th day of March 1960.

[SEAL]

Attest:
KARL H. AXLINE,
*Attesting Officer.*

ROBERT C. WATSON,
*Commissioner of Patents.*